(No Model.)
G. W. McKENZIE.
WEEDING IMPLEMENT.
No. 520,212. Patented May 22, 1894.
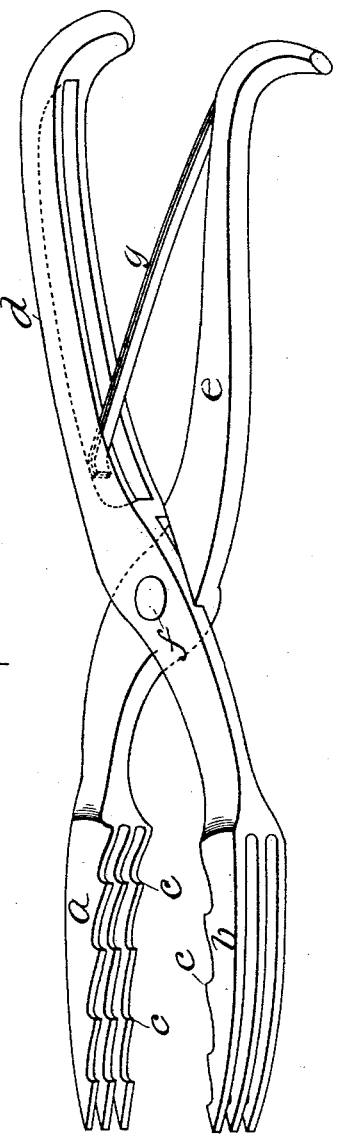
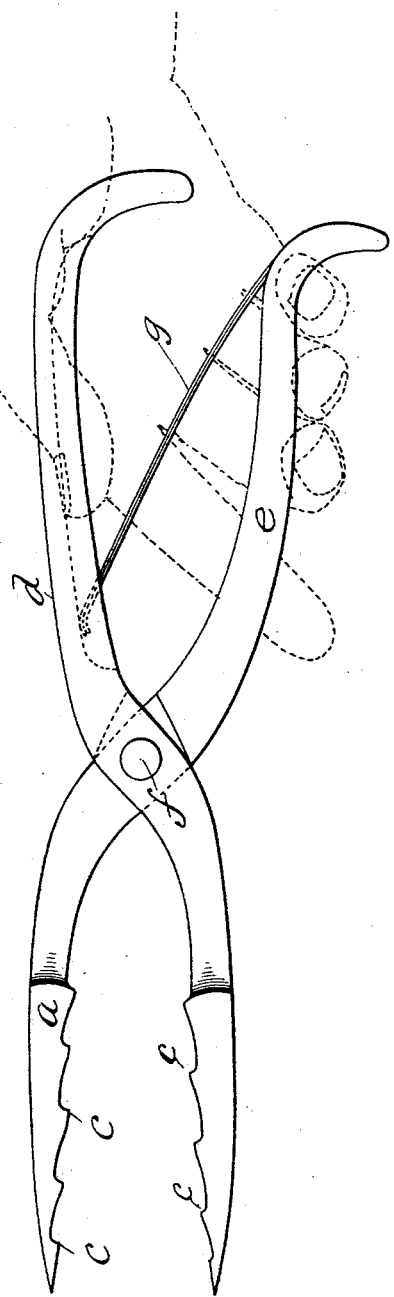
WITNESSES:
Arthur H. Abell.
C. A. Benson
INVENTOR:
Geo. W. McKenzie,
by Wight Brown & Crossley
His Atty's.

UNITED STATES PATENT OFFICE.

GEORGE W. McKENZIE, OF BOSTON, MASSACHUSETTS.

WEEDING IMPLEMENT.

SPECIFICATION forming part of Letters Patent No. 520,212, dated May 22, 1894.

Application filed August 18, 1893. Serial No. 483,469. (No model.)

*To all whom it may concern:*

Be it known that I, GEORGE W. MCKENZIE, of Boston, in the county of Suffolk and State of Massachusetts, have invented certain new and useful Improvements in Weeding Implements, of which the following is a specification.

This invention has relation to implements for weeding cranberry meadows, lawns, vegetable and flower gardens, &c., and has for its object the provision of an efficient device whereby the weeder may be inserted between the vines and plants, and the weed gotten hold of and drawn out by the roots without unduly disturbing the earth excepting immediately around the roots of the weed.

It is also the object of the invention to provide a weeder in which the handles may be so constructed as to facilitate the insertion of the weeder into the ground and the withdrawal of it with the weeds therefrom.

To these ends my invention consists of the improvements hereinafter described in detail, and pointed out with particularity in the claims hereunto appended.

Reference is to be had to the annexed drawings and to the letters marked thereon, forming a part of this specification, the same letters designating the same parts or features, as the case may be, wherever they occur.

Of the drawings—Figure 1 is a perspective view of my invention. Fig. 2 is a side view, showing by dotted lines how it may be taken hold of by the hand of the user.

In the drawings—*a* designates one prong, and *b* the other of the fork-part of my improved weeding implement. The forward part of each prong is divided into a plurality of tines (in the present case shown to be three) which prongs are for the sake of lightness and strength made broad and thin. Each tine is notched on its inner edge so as to form teeth *c*, the teeth of the tines of one prong coming into the notches of the tines of the opposing prong when the two prongs are brought together.

*d* designates the handle for the prong *b*, and *e* the handle for the prong *a*, the handles being crossed and pivotally connected at their crossing point as at *f*, so that the device may be operated as a pair of tongs, a spring *g* being interposed between the handles to keep them normally apart.

The end of the handle *d* is curved inward and the end of the handle *e* outward,—making the curve of the two in the same direction, so that when the implement is taken hold of the curve on the end of the handle *d* may fit in the palm of the hand and form a convenient means for thrusting the implement into the ground, while the curve on the handle *e* forms a bearing or abutment for the fingers of the hand in drawing upward on the implement in the pulling up of the weeds.

In use the implement will be taken in the hand, as shown in Fig. 2, and with the prongs slightly open, they may be thrust down into the ground around the roots of the weed, when the hand may be closed, closing the prongs on the roots, and with a twisting motion the weed may be pulled up without lifting or disturbing the soil beyond the prongs of the device. In pulling up on the weeder the curve at the end of the handle *e* serves with the highest efficiency in preventing the hand of the user from slipping from the handles of the implement.

This implement is particularly well adapted for weeding cranberry meadows where it is desirable to get down between the vines and pull up the weeds without considerable disturbance of the vines or soil, though it is quite as well adapted for use in garden, on lawns, and elsewhere. The teeth on the tines serve to make firm the hold on the roots of the weeds so that the pulling up of the latter may be made certain.

The implement is adapted to be used so that more work can be accomplished by it in a given time than by the small prong-hoe heretofore commonly used, without any of the attendant disadvantages of the latter.

Having thus explained the nature of the invention and described a way of constructing and using the same, though without attempting to set forth all of the forms in which it may be made or all of the modes of its use, it is declared that what is claimed is—

1. A weeding implement comprising in its construction two sharp pointed prongs, and handles for operating the same as tongs, the prongs extending in substantially straight line from the handles, and each prong being composed of a plurality of broad flat tines with teeth on their inner edges, as set forth.

2. A weeding implement comprising in its construction two sharp pointed prongs consisting of a plurality of broad flat tines and handles for operating the same, the end of one handle being curved inwardly and the other outwardly, as set forth.

3. A weeding implement comprising in its construction two sharp pointed prongs and handles for operating the same as tongs, each prong being composed of a plurality of broad flat tines with teeth on their inner edges, the end of one handle being curved inwardly and the other outwardly, and a spring between the handles to keep them normally separated, as set forth.

In testimony whereof I have signed my name to this specification, in the presence of two subscribing witnesses, this 14th day of August, A. D. 1893.

GEORGE W. McKENZIE.

Witnesses:
ARTHUR W. CROSSLEY,
ARTHUR H. ABELL.